United States Patent
Lev et al.

(10) Patent No.: US 10,067,965 B2
(45) Date of Patent: Sep. 4, 2018

(54) HIERARCHIC MODEL AND NATURAL LANGUAGE ANALYZER

(71) Applicant: Twiggle Ltd., Tel-Aviv (IL)

(72) Inventors: Iddo Lev, Tel-Aviv (IL); Eli Shalom, Tel-Aviv (IL); Adi Avidor, Tel-Aviv (IL)

(73) Assignee: Twiggle Ltd., Tel-Aviv (IL)

( * ) Notice: Subject to any disclaimer, the term of this patent is extended or adjusted under 35 U.S.C. 154(b) by 0 days.

(21) Appl. No.: 15/275,620

(22) Filed: Sep. 26, 2016

(65) Prior Publication Data

US 2018/0089242 A1 Mar. 29, 2018

(51) Int. Cl.
*G06F 17/30* (2006.01)
*G06F 17/27* (2006.01)

(52) U.S. Cl.
CPC .... *G06F 17/30321* (2013.01); *G06F 17/2785* (2013.01); *G06F 17/30294* (2013.01); *G06F 17/30554* (2013.01)

(58) Field of Classification Search
CPC ........... G06F 17/30997; G06F 17/3021; G06F 17/2785; G06F 17/30294; G06F 17/30554
See application file for complete search history.

(56) References Cited

U.S. PATENT DOCUMENTS

| | | | |
|---|---|---|---|
| 7,627,671 B1 | 12/2009 | Palma et al. | |
| 7,644,052 B1 | 1/2010 | Chang et al. | |
| 7,917,484 B1 * | 3/2011 | Vermeulen | G06F 21/105 707/705 |
| 8,260,771 B1 | 9/2012 | Ortega et al. | |
| 8,781,916 B1 * | 7/2014 | Buryak | G06Q 30/0631 705/26.7 |
| 9,069,566 B1 | 6/2015 | Kumar et al. | |
| 9,069,825 B1 | 6/2015 | Chang | |
| 2001/0044758 A1 | 11/2001 | Talib et al. | |
| 2002/0087416 A1 | 7/2002 | Knutson | |
| 2003/0193994 A1 | 10/2003 | Stickler | |
| 2004/0024739 A1 * | 2/2004 | Copperman | G06F 17/30616 |
| 2004/0117402 A1 | 6/2004 | Tateson et al. | |
| 2005/0154708 A1 | 7/2005 | Sun | |
| 2005/0160056 A1 * | 7/2005 | Hugh | G06N 5/022 706/46 |
| 2005/0192926 A1 | 9/2005 | Liu et al. | |
| 2005/0222987 A1 | 10/2005 | Vadon | |

(Continued)

OTHER PUBLICATIONS

Official Action dated Sep. 29, 2017 From the US Patent and Trademark Office Re. U.S. Appl. No. 15/681,514. (13 pages).

(Continued)

*Primary Examiner* — Tarek Chbouki

(57) ABSTRACT

A system and method for interpretation of product-related data, including extracting product information from a product-related dataset of an e-commerce data source, determining at least one representation of the product information by elements of a product database model, by finding model elements corresponding to elements of the product information and selecting model elements that form consistent representation of the product information with hierarchic relations between the model elements, and creating an indexed product database by indexing according to the representing model elements the at least one determined representation of the product information.

22 Claims, 5 Drawing Sheets

(56) References Cited

U.S. PATENT DOCUMENTS

| | | |
|---|---|---|
| 2006/0026203 A1* | 2/2006 | Tan .................. G06F 17/277 |
| 2007/0203929 A1 | 8/2007 | Bolivar |
| 2007/0219857 A1* | 9/2007 | Seymour ............ G06Q 30/0277 |
| | | 705/14.73 |
| 2008/0109327 A1* | 5/2008 | Mayle ................ G06Q 30/0603 |
| | | 705/27.1 |
| 2009/0192784 A1 | 7/2009 | Cole et al. |
| 2010/0049731 A1* | 2/2010 | Kiran Vedula .... G06F 17/30997 |
| | | 707/736 |
| 2011/0103682 A1 | 5/2011 | Chillovskii et al. |
| 2011/0320191 A1 | 12/2011 | Makeyev |
| 2012/0259882 A1 | 10/2012 | Thakur et al. |
| 2013/0066740 A1 | 3/2013 | Ouimet et al. |
| 2013/0132365 A1* | 5/2013 | Chang ................ G06Q 30/0241 |
| | | 707/710 |
| 2013/0246328 A1 | 9/2013 | Sweeney et al. |
| 2013/0332460 A1* | 12/2013 | Pappas .............. G06F 17/30705 |
| | | 707/740 |
| 2013/0339340 A1 | 12/2013 | Pfitzner |
| 2014/0372956 A1 | 12/2014 | Bisca et al. |
| 2015/0019204 A1 | 1/2015 | Simrad et al. |
| 2015/0051979 A1* | 2/2015 | Knab ................ G06Q 30/0269 |
| | | 705/14.66 |
| 2015/0286886 A1 | 10/2015 | Wimmer et al. |
| 2015/0348148 A1* | 12/2015 | Sharma .............. G06Q 30/0631 |
| | | 705/26.2 |
| 2016/0019294 A1 | 1/2016 | Dong et al. |
| 2016/0078038 A1* | 3/2016 | Solanki ............ G06F 17/30719 |
| | | 707/727 |
| 2017/0060868 A1* | 3/2017 | Rais Ghasem ...... G06F 17/3043 |
| 2017/0140405 A1 | 5/2017 | Gottemukkala et al. |
| 2017/0148082 A1* | 5/2017 | Murahari ........... G06Q 30/0631 |
| 2017/0185674 A1 | 6/2017 | Tonkin et al. |
| 2017/0206416 A1 | 7/2017 | Chen et al. |
| 2017/0316066 A1 | 11/2017 | Mohan |
| 2017/0323636 A1 | 11/2017 | Xiao et al. |
| 2018/0089212 A1 | 3/2018 | Deutsch Peled et al. |
| 2018/0089316 A1 | 3/2018 | Ganot et al. |

OTHER PUBLICATIONS

Official Action dated Apr. 6, 2018 From the US Patent and Trademark Office Re. U.S. Appl. No. 15/416,337. (28 pages).

Official Action dated Apr. 6, 2018 From the US Patent and Trademark Office Re. U.S. Appl. No. 15/879,521. (24 pages).

Official Action dated Apr. 10, 2018 From the US Patent and Trademark Office Re. U.S. Appl. No. 15/681,514. (20 pages).

* cited by examiner

HIERARCHIC MODEL AND NATURAL LANGUAGE ANALYZER

BACKGROUND

The present invention, in some embodiments thereof, relates to web searches and, more specifically, but not exclusively, to product-related searches in e-commerce websites.

Known e-commerce product search services utilize keyword search engines. Such engines don't take into account relations between e-commerce concepts and frequently return unsuitable results, making the search for a desired product or for a list of suitable products very cumbersome and inconvenient for a user, which is forced to perform many search iterations and/or eventually may fail to find what he looks for.

SUMMARY

According to an aspect of some embodiments of the present invention there is provided a system for interpretation of product-related data, the system including a processor configured to execute code for extracting product information from a product-related dataset of an e-commerce data source, determining at least one representation of the product information by elements of a product database model, by finding model elements corresponding to elements of the product information and selecting model elements that form consistent representation of the product information with hierarchic relations between the model elements, and creating an indexed product database by indexing according to the representing model elements the at least one determined representation of the product information. The hierarchic relations include at least one of inheritance and partonomy.

According to some embodiments of the present invention, the processor is configured to execute code for detecting among the found corresponding model elements a model element of high hierarchy relative to the other found model elements, and filtering out possible representing model elements which are inconsistent with the high hierarchy model element.

According to some embodiments of the present invention, a model element is at least one of a list including a product-related concept, an attribute of a concept, an enriched attribute depending on other attributes, a value of an attribute or a limitation on an attribute's value space, wherein a concept is a model element representing a certain kind of products or parts of products and an attribute is a model element representing properties of the concept.

In some embodiments, a model element includes an instance of a concept representing a concept with a specific value of at least one of its attributes, which may have secondary attributes.

In some embodiments, the processor is configured to execute code for receiving along with product information an indication about a product, a concept, an attribute and/or a value thereof, to which the product information relate, and limiting the found model elements to the indicated product, concept, attribute and/or value.

In some embodiments of the present invention, a model element corresponding to a term includes the same term, a similar term and/or a synonym of the term.

In some embodiments of the present invention, the processor is configured to execute code for determining at least one representation of the search query received from a search server by elements of the product database model, by finding model elements corresponding to elements of the search query and selecting model elements that form consistent representation of the search query with hierarchic relations between the model elements, and transmitting the determined interpretation to the search server, thus enabling the search server to match the representation of the search query to modeled representations of products stored in the indexed product database.

In some embodiments, the processor is configured to execute code for filtering possible representing model elements in a pre-defined manner when corresponding pre-defined expressions are included in the search query, a pre-defined expression is indicative of at least one of a list including a relation, a threshold, and a value restriction.

The pre-defined expressions may include at least one of a list including the expressions: less than, more than, between, cheap, large, small and best for.

In some embodiments, the processor is configured to execute code for filtering out all products with a price above a predetermined threshold value when a corresponding expression is included in the search query. The threshold value may depend on a concept identified in the search query.

In some embodiments, the processor is configured to execute code for calculating, in response to an expression included in the search query, a certain value of an enriched attribute based on one or more attributes, and filtering out products that don't fit the value.

According to some embodiments of the present invention, the processor is configured to execute code for identifying a model element to which a value in the product information refers, according to a space of possible values of the a model elements implemented in the database model. In some embodiments, the processor is configured to execute code for ranking a possible representing model element according to frequency of use deduced from value distributions of attribute values implemented in the database model.

In some embodiments of the present invention, the processor is configured to execute code for identifying a model element to which a value in the product information refers, according to data implemented in the database model ascribing customary attributes to corresponding concepts.

In some embodiments of the present invention, the processor is configured to execute code for identifying to which of several possible model elements the product information refers, according to the attributes each of the possible model elements can have.

In some embodiments of the present invention, the processor is configured to execute code for interpreting separate terms of the product information as a concept, an attribute of the concept and/or a value of the attribute, respectively.

In some embodiments of the present invention, the processor is configured to execute code for calculating a Boolean value of a model element and filter out possible representations based on the calculated Boolean value.

According to an aspect of some embodiments of the present invention there is provided a method for interpretation of product-related data, the method including extracting product information from a product-related dataset of an e-commerce data source, determining at least one representation of the product information by elements of a product database model, by finding model elements corresponding to elements of the product information and selecting model elements that form consistent representation of the product information with hierarchic relations between the model elements, and creating an indexed product database by indexing according to the representing model elements the at least one determined representation of the product information.

In some embodiments, the method includes determining at least one representation of the search query received from a search server by elements of the product database model, by finding model elements corresponding to elements of the search query and selecting model elements that form consistent representation of the search query with hierarchic relations between the model elements, and transmitting the determined interpretation to the search server, thus enabling the search server to match the representation of the search query to modeled representations of products stored in the indexed product database.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below.

In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
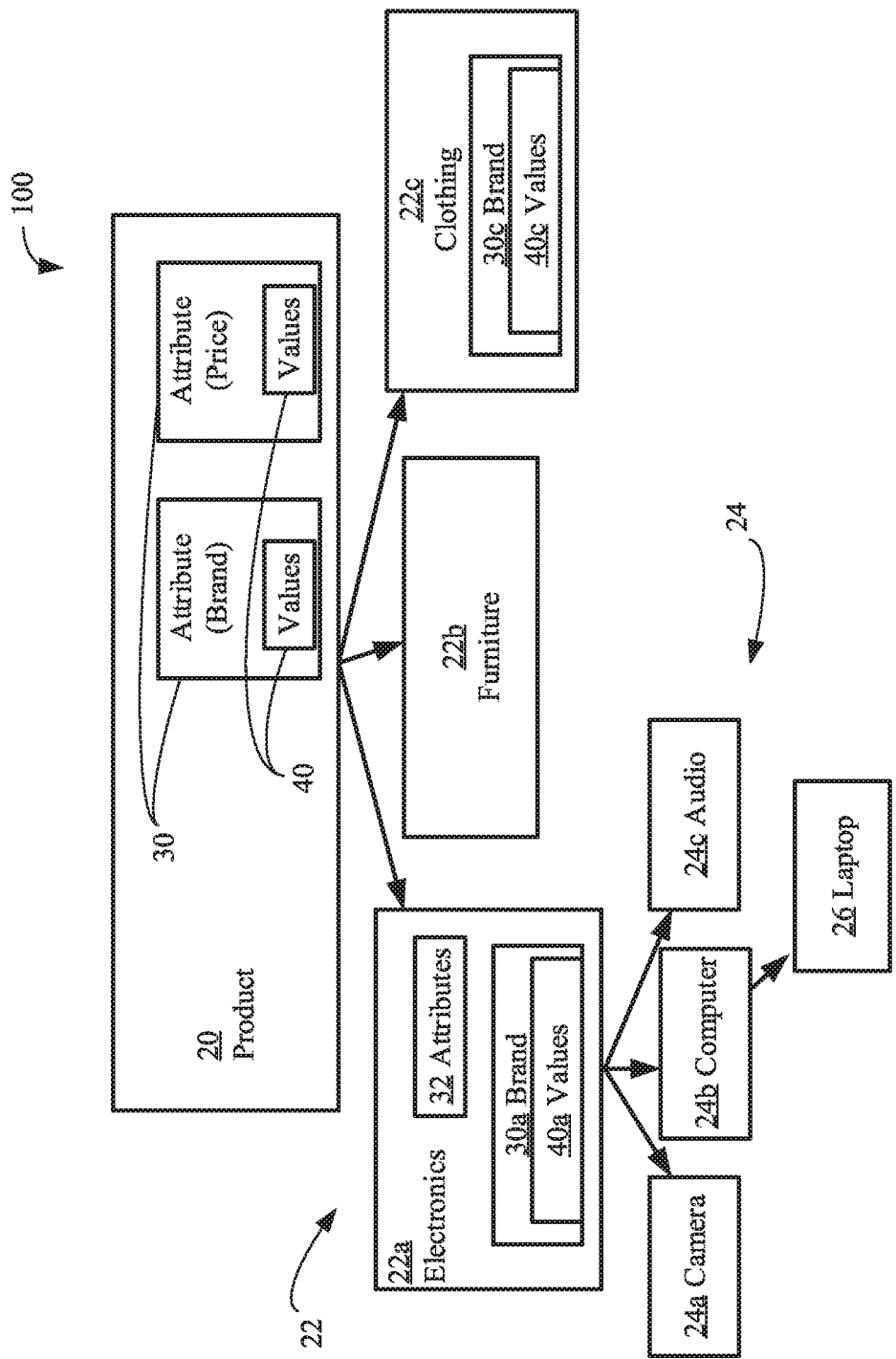
FIGS. 1A and 1B are schematic illustrations of exemplary portions of a hierarchic database model, according to some embodiments of the present invention.

Some embodiments of the present invention provide a system and method for enhanced interpretation of product-related data, according to e-commerce expert knowledge implemented in a hierarchic product database model. The enhanced interpretation provided by some embodiments of the present invention facilitates transition of data from a website, e-commerce database or any other suitable data source, to an indexed model-based hierarchic database.

Arrangement of an e-commerce website product data in such model-based database facilitates interpretation of the database and the search terms according to the same model, and thus, for example, extraction of data that suits better the intentions of a user.

Some embodiments of the present invention provide a hierarchic database model representing comprehensive knowledge about cataloging and categorization of e-commerce products. The hierarchic model is used by a natural language analyzer (NLA) to provide enhanced indexing and search query interpretation, according to some embodiments of the present invention.

A hierarchic database model, according to some embodiments of the present invention, may include a hierarchy of concepts, i.e. database model nodes that represent product categories, rooted in a general super-concept of products such as e-commerce products.

A concept is a model element representing a certain kind of products or parts of products. For example, a concept "Chair" is the concept of all chair products, a concept "Laptop" is the concept of all laptop computer products, and the like. Concepts may include information about relations to other concepts, such as inheritance or meronomy (i.e. partonomy). For example, a concept "Seat" may represent a component of the concept "Chair" and therefore may include a meronomy relation to the Chair concept. Some concepts may represent products that may be sold as a separate product by themselves or as components of other products.

For example, a computer processor may be sold as a separate product or within a computer.

Each concept in the hierarchic model may have attributes representing properties of the concept and possible values of these attributes. For example, a Laptop concept may have a Weight attribute. For each attribute, the model defines the types of values that can be assigned to this attribute. Possible types of values may include, for example, a number, a string, a size (number+unit), and/or an instance of another concept.

The model may define a list of specific possible values that are allowed as values of the attribute, and/or it a range of possible values. For example, the model may define a minimal and maximal numeric value allowed for the attribute. In some embodiments, each attribute includes information about distribution of values of this attribute.

An instance of a concept represents an entity whose type is the concept. For example, an instance of the concept "mobile phone" may include a certain brand, color, size, and/or any other property of the instance. An instant of the concept has specific values of some or all of its attributes, i.e. an instance contains an assignment of specific values for some or all of its concept's attributes, in accordance with the defined value-types of the attributes as well as the possible values or value range defined for the attribute.

The interpretation system according to some embodiments of the present invention analyses texts and/or information input about products, such as, for example, user queries, specifications, titles, descriptions, overviews and/or reviews, and produces a structured representation of the input's meaning, formed of concepts, attributes, relations, values and/or constraints of the model.

According to some embodiments of the present invention, each of the interpretation system(s) and/or method(s) executes a natural language analyzer (NLA) for interpreting terms in a context of product information according to the hierarchic product model.

The interpretation process may create a dedicated e-commerce database indexed and constructed according to the hierarchic product model by obtaining the NLA's term interpretations, and based on the interpretations indexing the product-related data into elements of the model-based database. Accordingly, a product-related data may be represented by elements of the model and the relations between them.

Further, the interpretation system provided by embodiments of the present invention may interpret by the NLA search queries and create model-based representations of the search queries, thus enabling a search server to perform model-based search in the website indexed database. A search server according to some embodiments of the present invention may match between the model-based representations of the search queries and elements of the model-based website database, thus finding in the database suitable products to output as search results.

The provided model-based database, searchable by the model-based representations of search queries, is designed to improve the way e-commerce data is stored and retrieved from the database, and thus improves the database operation.

By using the hierarchic model and the NLA provided by some embodiments of the present invention, the system and method described herein solves the problem of inaccurate search results in e-commerce website, and provides, in response to product-related searches, product suggestions that match the meaning of the search query as the user intended.

This is thanks to an indexed database based on a hierarchic model and implementation in the hierarchic model of common uses of terms and/or values and relations between terms and/or values, along with limited value-spaces and/or value distributions.

It will be appreciated that as used herein, a term may include one or more words.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Python, Javascript, Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
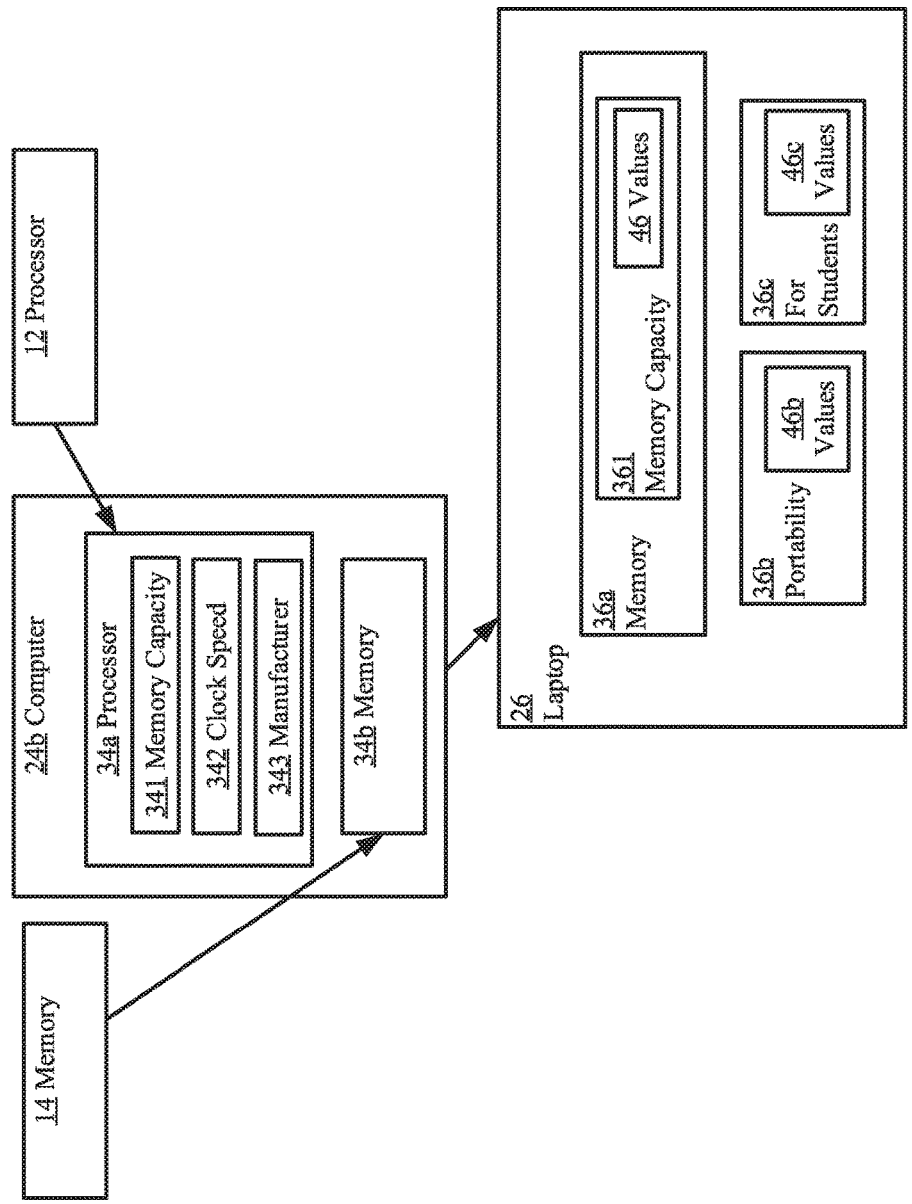

Reference is now made to FIGS. 1A and 1B, which are schematic illustration of exemplary portions of a hierarchic database model 100, according to some embodiments of the present invention. As discussed herein, the top of model 100 may be a Product super-concept 20, representing a general concept of products or e-commerce products. Product super-concept 20 has attributes 30 such as, for example, Brand, Price, Place of Manufacture, and/or any other suitable product attributes. Each attribute may include a possible value space 40.

Model 100 includes inheriting concepts 22 which inherit attributes 30 directly from Product super-concept 20 and optionally may include further attributes 32. An inheriting concept 22 may restrict a value space 40 of an attribute 30 to possible values that are relevant to the concept 22. For example, inheriting concept 22 may include Electronics concept 22a, Furniture concept 22b, Clothing concept 22c, and/or any other suitable concept that inherit directly from Product super-concept 20. A value space 40a of Electronics Brand attribute 30a of Electronics concept 22a, is restricted to electronics brands and may exclude, for example, the value 'Zara' that may belong to a value space 40c of Clothing Brand attribute 30c of Clothing concept 22c.

Several inheriting concepts 24 may inherit from an inheriting concept 22. For example, Camera concept 24a, Computer concept 24b, Audio System concept 24c and/or any other suitable concept may inherit from Electronics concept 22a. Each of these may have inheriting concepts as well, and so on. For example, a Laptop Computer concept 26 may inherit from Computer concept 24b.

Some attributes may include instances of concepts, for example concepts with specific values. For example, a Computer Processor attribute 34a of Computer concept 24b may include an instance of a Processor concept 12, and/or a concept inheriting from the Processor concept.

The Computer Processor concept represents both a stand-alone product that may be sold separately and a component of a Computer concept 24b. Similarly, a Memory attribute 34b of Computer concept 24b may include an instance of a Memory concept 14, and/or a concept inheriting from the Memory concept. Such instances may have their own attributes, i.e. secondary attributes. An instance value in a Computer Processor attribute 34a may have secondary attributes such as, for example, Memory Capacity attribute 341, Clock Speed attribute 342, Manufacturer attribute 343, and or any other suitable attribute of a computer processor. Each attribute may have a corresponding possible value space. For example, a Memory Capacity attribute 361 of instances in a Memory attribute 36a of Laptop concept 26 has a possible value space 46a, possibly stored along with the distribution of possible memory capacity values.

Some attributes are enriched attributes, i.e. attributes that are calculated based on other attributes, based on formulas representing domain expert knowledge about relationships between the attributes. For example, a Portability enriched attribute 36b may have a value space 46b of values indicating how portable the laptop is. The values are calculated based on various attributes such as weight, size, battery life and/or other suitable attributes.

For example, Suitability for Students enriched attribute 36c may have a value space 46c, the values of which may be calculated based on price, portability and/or other suitable attributes. Some attributes may have Boolean values, such as true or false. For example, Boolean value attributes may be attributes that define a type and/or suitability for certain application and/or use, for example, Waterproof (yes or no) or For Students (yes or no), and/or attributes that define inclusion of a certain feature, such as SD Slot (included or not) or USB Port (included or not), and/or other suitable attributes.

A NLA according to some embodiments of the present invention analyses, by using model 100, various texts about products, such as, for example, user queries, specifications, titles, descriptions, overviews and/or reviews. Based on the analysis, the NLA produces a structured representation of the texts' meaning, formed of concepts, attributes, relations, values and/or constraints of model 100.

Figure 2:
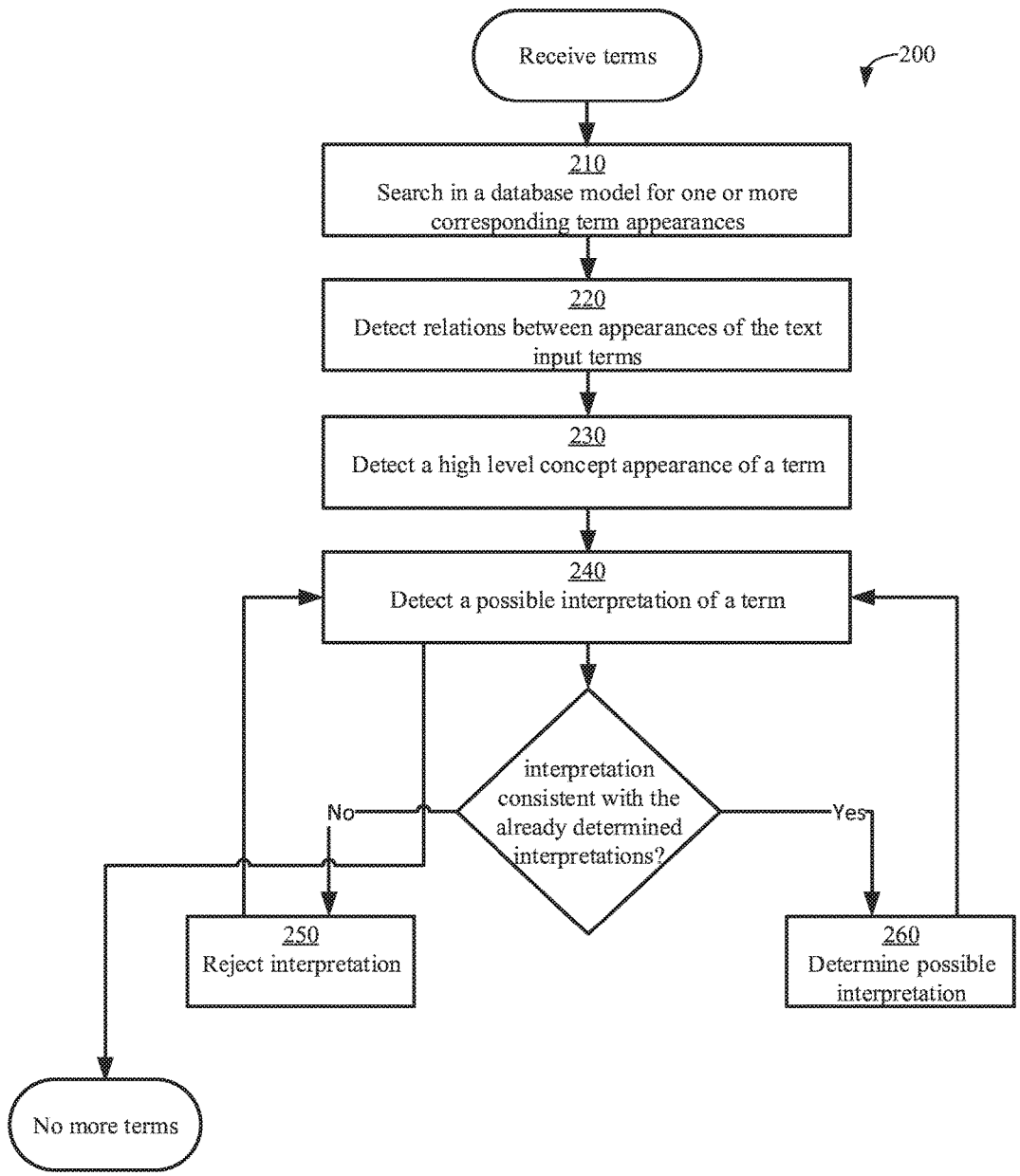
FIG. 2 is a schematic flowchart illustrating a method for interpretation of product-related data, according to some embodiments of the present invention.
Figure 3:
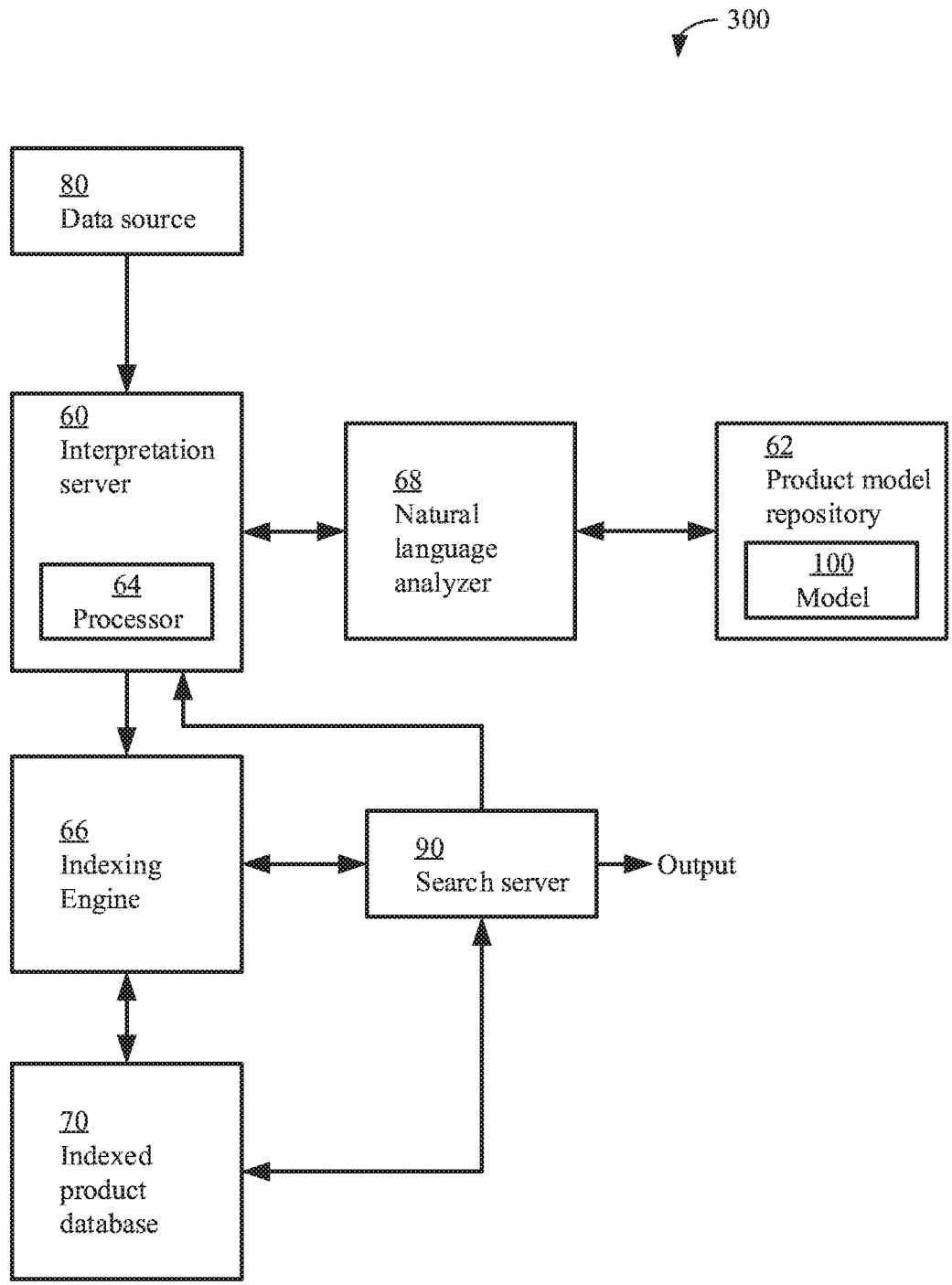
FIG. 3 is a schematic illustration of a system for interpretation of product-related data, according to some embodiments of the present invention.

Reference is now made to FIG. 2, which is a schematic flowchart illustrating a method 200 for interpretation of product-related texts, according to some embodiments of the present invention. Further reference is made to FIG. 3, which is a schematic illustration of a system 300 for interpretation of product-related texts, according to some embodiments of the present invention.

System 300 includes an interpretation server 60 and a product model repository 62. Product model repository 62 may store model 100. Interpretation server 60 may include at least one processor 64, which may control and/or execute an indexing engine 66 and a NLA 68.

Interpretation server 60 may receive text input, for example a string of text relating to an e-commerce product, interpret the terms in the text input by NLA 68 and based on model 100, and create a modeled representation of the text input by indexing engine 66, in accordance with model 100. As described in more detail herein, modeled representations of product information from a data source 80 may be stored as an indexed product database 70. As further described in more detail herein, interpretation server 60 may use NLA 68 to generate representations of search query text according to model 100, thus enabling a search server 90 to perform search in indexed product database 70 according to the modeled representation of the search query.

For a term in the text input, as indicated in block 210, NLA 68 finds in model 100 stored in product model repository 62 one or more corresponding term appearances, which may include, for example, the same term, a similar term and/or a synonym. Each term appearance represents an interpretation of the term. A term appearance may be a concept, an attribute, or a value. Each term appearance has a location in the model, indicative of related concepts, attributes and/or values.

As indicated in block 220, NLA 68 may detect relations between appearances of the text input terms. Then, as indicated in block 230, NLA 68 may detect appearance of a term as a high-level concept in model 100. A high-level concept appearance may be a concept of high or highest hierarchy, for example relative to other concepts and/or appearances of the received text input. For example, a high-level concept appearance may be a concept that concept appearances of other terms of the same input inherit from directly and/or indirectly, and/or that attribute appearances of other terms are attributes of the high level concept or an inheriting concept.

Such high level concept appearance may be used to limit the possible interpretations of other terms. An interpretation that is not related to the detected high level concept may be rejected by NLA 68. At this stage, as indicated in block 240, NLA 68 may detect possible interpretations of at least some of the terms, i.e. determine that term appearance is possibly a correct interpretation of the term in the specific text input, for example, according to a relation of an interpretation to the high level concept.

Some concepts, attributes and/or values in model 100 may limit the possible interpretations to certain concepts, attributes, value spaces and/or values of the attributes. NLA 68 may filter the term appearances according to appearances of other terms of the same text input, in order to find the possible interpretations. That is, as indicated in blocks 250 and 260, NLA 68 may reject interpretations that are not consistent with the already determined interpretations, and determine further possible term interpretations, and so on, until no more interpretations can be determined and/or rejected.

In some embodiments of the present invention, system 300 may communicate with a user to request clarifications from a user regarding the input text. For example, when there is more than one possible interpretation, system 300 may ask for additional information to decide between the possible interpretations.

In some embodiments of the present invention, NLA 68 may receive along with a text input an indication of a product and/or a certain product instance, to which the text input relate.

In some embodiments, NLA 68 may receive along with a text input an indication of a concept and/or an attribute to which the text input relate. For example, NLA 68 may receive values of a processor's attribute along with an indication that the values pertain to a Processor concept, and/or along with an indication of a certain laptop model that the values pertain to. Accordingly, NLA 68 may limit the search for term appearances to attributes of a processor.

For example, NLA 68 may find an appearance of a term as a value of a Processor attribute, a Processor's Manufacturer attribute, a Clock Speed attribute, or a value of any other suitable processor's attribute. Since the term processor may have appearances as a concept or as an attribute which is also a concept, NLA 68 may also receive an indication of a concept to which the instance of the Processor attribute relate, such as a computer, a laptop computer, or another suitable machine. For example, NLA 68 may receive a text input "Intel 2.2 GHz" along with an indication that this is a value of a processor of a laptop. NLA 68 may search model 100 under the Laptop concept and the Processor attribute, and may find an appearance of "Intel" as a value of a Processor's Manufacturer attribute, and/or an appearance of "2.2 GHz" as a value of a Processor's Clock Speed attribute. Accordingly, NLA 68 may create a modeled product representation, wherein each value is ascribed to a certain concept and/or attribute.

For example, a certain Laptop product is represented by a Laptop concept instance, for which "Intel" is a value ascribed to a Manufacturer attribute of a processor concept/attribute, and/or 2.2 GHz is a value ascribed to a Clock Speed attribute of a processor concept/attribute.

In some embodiments of the present invention, interpretation server 60 uses instances of concepts that are implemented in the model. For example, NLA 68 may recognize that "Intel" is an instance of a "brand" or "manufacturer" concept, based on implementation of this knowledge in the model. In some embodiments of the present invention, instances of concepts are generated, for example based on the NLA's ability to recognize such instances in the text input. For example, interpretation server 60 may add to the model an instance of a concept "chair", such as "safety chair", in case the safety chair instance is needed for the interpretation process.

As mentioned above, system 300 may produce an indexed product database 70 based on product information, for example product-related text, obtained, for example received and/or extracted, from a product-related dataset stored in a data source 80. Data source 80 may be, for example, an e-commerce website or a database gathering knowledge about products presented in a website. More specifically, indexing engine 66, controlled by interpretation server 60, may use NLA 68 to create indexed product database 70, by indexing product information according to model 100.

Product database 70 may be dedicated and/or formed according to a specific data source or to a group of data sources. The product information may include a product specification, a table of a product's features, a table of values of a product's features, a product title, a product description, and/or any other suitable text about a product.

Figure 4:
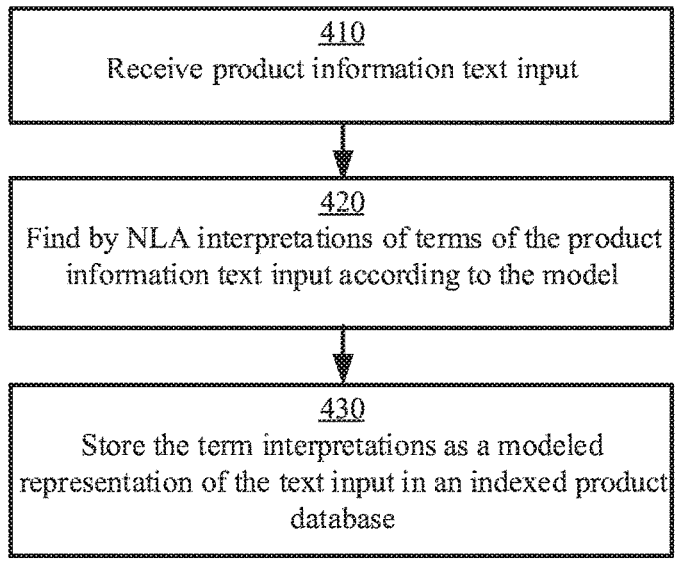
FIG. 4 is a schematic flowchart illustrating a method for creation of an indexed product database, according to some embodiments of the present invention.

Further reference is now made to FIG. 4, which is a schematic flowchart illustrating a method 400 for creation of indexed product database 70, according to some embodiments of the present invention. As indicated in block 410, interpretation server 60 may receive product information from data source 80. As indicated in block 420, interpretation server 60 finds by NLA 68 interpretations of terms of the product information according to model 100, as described in detail with reference to FIG. 2.

As indicated in block 430, indexing engine 66 stores the term interpretations as a modeled representation of the text input in indexed product database 70, i.e. an interpretation indexed according to model 100. One or more interpreted text inputs that relate to the same product may form a modeled product representation in indexed product database 70.

Interpretation server 60 may communicate with a search server 90, which receives search queries, obtains from interpretation server 60 their modeled interpretation indexed according to model 100, and finds search results in indexed product database 70, by matching the modeled search query interpretation to corresponding modeled product representations stored in indexed product database 70.

Figure 5:
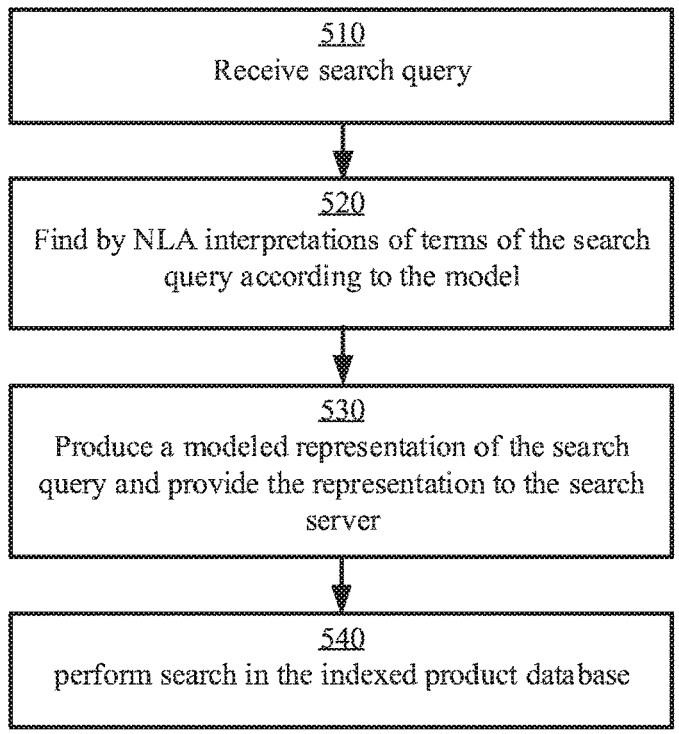
FIG. 5 is a schematic flowchart illustrating a method for interpretation of product-related search queries, according to some embodiments of the present invention.

Further reference is now made to FIG. 5, which is a schematic flowchart illustrating a method 500 for interpretation of product-related search queries, according to some embodiments of the present invention. As indicated in block 510, Interpretation server 60 may receive from search server 90 a search query including at least one term, and may use NLA 68 to find in model 100 stored in product model repository 62 one or more interpretations, i.e. corresponding term appearances, which may include, for example, the same term, a similar term and/or a synonym.

As mentioned with reference to FIG. 2, a term appearance may be a concept, an attribute, or a value. Each term appearance has a location in the model, indicative of related concepts, attributes and/or values.

As indicated in block 520, interpretation server 60 finds by NLA 68 interpretations of terms of the search query according to model 100, as described in detail with reference to FIG. 2. Accordingly, NLA 68 may, for example, detect relations between appearances of the query terms, find high-level-concept appearances and/or other term appearances in model 100, reject inconsistent interpretations and determine term interpretations. The determined modeled interpretation of the search query may be transmitted to search server 90. As indicated in block 530, indexing engine 66 produces a modeled representation of the search query, and provides the modeled representation to search server 90.

As indicated in block 540, search server 90 may perform search in indexed product database 70, by detecting modeled product representations that match the modeled representation of the search query. As indicated in block 550, the detected matching product representations may be outputted by search server 90 as search results and/or query terms suggestions.

NLA 68 may be configured to filter term interpretations in a pre-defined manner when corresponding pre-defined expressions indicative of relations, thresholds, and/or restrictions are included in the text input. For example, NLA 68 may be configured to perform filtering according to relative expressions such as, for example, less than, more than, between, cheap, large, small, best for, and/or other suitable relative expressions. For example, NLA 68 may be configured to interpret an expression, for example "cheap" or another suitable expression, as a command to filter out all products with a price above a predetermined threshold value. For example, the threshold value may depend on an identified product category, i.e. a product type concept identified in the text input. Other expressions may be interpreted by NLA 68 as commands to filter out products that don't fit a certain value. In some cases, NLA 68 is instructed by the command to calculate a certain value and/or threshold value based on one or more attributes, and filter out products that don't fit the value and/or the threshold value. Accordingly, NLA 68 may be configured to interpret various relative expressions as respective filtering commands, which may depend on pre-defined thresholds and/or values, and/or on identified concepts, attributes and/or values in the text input.

In some cases, NLA 68 may identify an attribute to which a value in a text input refers, according to a space of possible values of the attributes. For example, NLA 68 may receive a memory capacity value that may refer to a computer RAM or to a computer hard drive. However, NLA 68 may identify that the memory capacity value is included in the value space of the attribute Memory Capacity of the attribute/concept Computer RAM, and excluded from the value space of the attribute Memory Capacity of the attribute/concept Computer Hard Drive, or vice versa. Therefore, NLA 68 may ascribe the memory capacity value to the suitable attribute/concept.

In some embodiments of the present invention, NLA 68 may provide a ranking to the term interpretations. For example, NLA 68 may receive a memory capacity value that may refer to a computer RAM or to a computer solid-state drive (SSD). In case the value is included in both value spaces, NLA 68 may ascribe a higher ranking to the more common interpretation. As described herein, the value spaces may be stored along with a distribution of values, i.e. the extent in which each value is used. Accordingly, NLA 68 may identify in which value space the received memory capacity value is used more frequently, and ascribe a higher ranking to the interpretation that includes the corresponding attribute/concept.

In some cases, NLA 68 may identify an attribute to which a value in a text input refers, according to statistical knowledge implemented in model 100, ascribing customary attributes to concepts. For example, NLA 68 may receive a television size value. Model 100 may define the diagonal length as a main size attribute of a television. A customary attribute of a certain concept may be assigned with a higher score in model 100 then other attributes which are less suitable to the concept. For example, the diagonal length attribute of the television concept is assigned with a higher score than other size attributes such as width.

Therefore, NLA 68 may ascribe the value to a television diagonal length and not, for example, to a width, height, or depth of a television. Accordingly, NLA 68 may filter products according to this value of television diagonal length. In some other embodiments, NLA 68 may ascribe higher ranking to an interpretation that includes a television diagonal length and a lower ranking to an interpretation that includes a width, height, or depth of a television.

In some cases, NLA 68 may identify to which of several possible attributes and/or concepts a text input refers, according to the attributes each of the possible attributes and/or concepts may have. NLA 68 may receive a text input that includes an attribute name, which may be an attribute of only some kinds of possible attributes and/or concepts. Therefore, NLA 68 may filter out the attributes and/or concepts that don't have the named attribute. For example, since only some camera concepts include a prism, a text input that includes the term Prism may cause NLA 68 to filter out attributes and/or concepts that don't have a Prism attribute.

The hierarchic structure of model 100 may facilitate search results and/or interpretations that suit better the user's intention. For example, by interpreting terms according to model 100, NLA 68 may interpret two terms of a search query/text input as a concept and an attribute of the concept, respectively, rather than interpreting the two terms as two stand-alone concepts. For example, NLA 68 may receive a search query or another text input that includes the terms Smartphone and Camera. As described herein, NLA 68 may identify in the text input a high-level concept, i.e. a concept of high hierarchy and/or from which interpretations of other terms inherit or to which interpretations of other terms constitute attributes.

For example, NLA 68 may find that Camera is an attribute of a Smartphone concept, and that Smartphone is not an attribute of a Camera concept. Therefore, NLA 68 may identify Smartphone as a high-level concept and Camera as an attribute of the Smartphone concept. Accordingly, NLA 68 may interpret the text input as Smartphone with Camera. In case the text input further includes the term Sharp, NLA 68 may find in model 100 that Sharp is an attribute of the Camera attribute/concept, and interpret the text input as Smartphone with Sharp Camera.

As described herein, model 100 may include enriched attributes of concepts, i.e. attributes that are calculated based on other attributes. In case a term in a text input received by NLA 68 has appearance as an enriched attribute, it may restrict the possible interpretations as any other attribute. For example, a Stool concept in model 100 may include a counter height suitability attribute, with values calculated based on a Height attribute. Accordingly, NLA 68 may filter out products with false counter height suitability attribute, in case a text input includes the terms Counter Height Stool and/or synonymous terms. Similarly, NLA 68 may filter out products with false Suitability for Students attribute, in case a text input includes, for example, the terms Laptop for Students and/or synonymous terms.

As described herein, Suitability for Students attribute may be an enriched attribute calculated based on, for example, a Portability attribute and a Price attribute. The portability attribute may be an enriched attribute calculated based on, for example, a Weight attribute, a Size attribute, and/or a Battery Life attribute.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment.

Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for creating a response to a search query using product-related data, comprising:
    at least one memory which stores an indexed hierarchic product database and a hierarchic product model arranging a plurality of product categories in a hierarchy, said hierarchic product model defines a plurality of attributes for each one of said plurality of product categories and a plurality of values for each of said plurality of attributes; and
    at least one hardware processor executing a code for:
    receiving natural language product information for each of a plurality of products from a product-related dataset of an e-commerce data source, said natural language product information defining product information elements descriptive of a respective said product;

for each of said plurality of products automatically indexing one of a plurality of modeled product representations into said indexed hierarchic product database according to said hierarchic product model, said indexing into said indexed hierarchic product database is performed by:
  creating a respective modeled product representation for said each product, said respective modeled product representation comprising at least some of a plurality of model elements, said plurality of model elements comprising said plurality of product categories, said plurality of attributes and said plurality of values of said hierarchic product model, said selected model elements are corresponding to at least one of synonyms and similar terms of said product information elements extracted, according to a natural language analysis (NLA), from a respective said natural language product information of said respective product,
  extracting, from said hierarchic product model, a plurality of hierarchic relations between said selected model elements, and
  indexing said respective modeled product representation of said respective product in said indexed hierarchic product database according to said selected model elements and said plurality of hierarchic relations;
receiving a natural language search query comprising at least one searched product information element indicative of at least one searched product;
modeling said natural language search query to create a modeled search query comprising at least one of said plurality of model elements corresponding to said at least one searched product information element extracted from said natural language search query;
automatically matching said modeled search query with at least some of said plurality of modeled product representations defined in said indexed hierarchic product database and retrieving matching said modeled product representations; and
transmitting a response to said natural language search query, said response comprising said matching modeled product representations.

2. The system of claim 1, wherein the processor is configured to execute code for detecting among the selected model elements a model element of high hierarchy relative to the other selected model elements, and filtering out possible representing model elements which are inconsistent with the high hierarchy model element.

3. The system of claim 1, wherein each of the selected model elements represents at least one of: a list comprising a product-related concept, an attribute of a concept, an enriched attribute depending on other attributes, a value of an attribute or a limitation on an attribute's value space; wherein a concept is a model element representing a certain kind of products or parts of products and an attribute is a model attribute representing properties of the concept.

4. The system of claim 3, wherein the processor is configured to execute code for receiving along with natural language product information an indication about a product, a concept, an attribute and/or a value thereof, to which the natural language product information relate, and limiting the plurality of selected model elements to the indicated product, concept, attribute and/or value.

5. The system of claim 3, wherein each of the selected model elements includes an instance of a concept representing a concept with a specific value of at least one of its attributes.

6. The system of claim 5, further comprising at least one of the plurality of model elements has at least one secondary attribute used for creating at least one of said plurality of modeled product representations and/or for modeling the modeled search query.

7. The system of claim 1, wherein the hierarchic relations include at least one of inheritance and partonomy.

8. The system of claim 1, wherein each of the plurality of selected model elements corresponding to a term includes the same term, a similar term and/or a synonym of the term.

9. The system of claim 1, wherein the processor is configured to execute code for the modeling an input text by determining at least one representation of the natural language search query received from a search server by elements of the hierarchic product model which are corresponding to elements of the natural language search query;
  wherein said plurality of selected model elements form a consistent representation of the natural language search query with hierarchic relations between the plurality of model elements;
  wherein the processor is configured to execute code for the automatically creating a response by transmitting the determined at least one representation to the search server, thus enabling the search server to match the at least one representation of the natural language search query to modeled representations of products stored in the indexed hierarchic product database.

10. The system of claim 9, wherein the processor is configured to execute code for filtering possible representing model elements in a pre-defined manner when corresponding pre-defined expressions are included in the natural language search query, a pre-defined expression is indicative of at least one of a list comprising a relation, a threshold, and a value restriction.

11. The system of claim 10, wherein the pre-defined expressions include at least one of a list comprising the expressions: less than, more than, between, cheap, large, small and best for.

12. The system of claim 10, wherein the processor is configured to execute code for filtering out all products with a price above a predetermined threshold value when a corresponding expression is included in the natural language search query.

13. The system of claim 12, wherein the threshold value depends on a concept identified in the natural language search query.

14. The system of claim 10, wherein the processor is configured to execute code for calculating, in response to an expression included in the natural language search query, a certain value of an enriched attribute based on one or more attributes, and filtering out products that don't fit the value.

15. The system of claim 1, wherein the processor is configured to execute code for identifying an attribute to which a value in the natural language product information refers to, according to a space of possible values of the the model attribute implemented in the hierarchic product model.

16. The system of claim 1, wherein the processor is configured to execute code for ranking a possible representing model element of the plurality of model elements according to frequency of use deduced from value distributions implemented in the hierarchic product model.

17. The system of claim 1, wherein the processor is configured to execute code for identifying a model attribute to which a value in the natural language product information refers, according to data implemented in the hierarchic product model ascribing customary attributes to corresponding concepts.

18. The system of claim 1, wherein the processor is configured to execute code for identifying which of several possible model elements of the plurality of model elements the natural language product information refers to, according to attributes each of the possible model elements can have.

19. The system of claim 1, wherein the processor is configured to execute code for interpreting separate terms of the natural language product information as a concept, a category, an attribute, and/or a value of the attribute, respectively.

20. The system of claim 1, wherein the processor is configured to execute code for calculating a Boolean value of a model attribute and filter out possible representations based on the calculated Boolean value.

21. A method for creating a response to a natural language search query using product-related data, comprising:

providing an indexed hierarchic product database and a hierarchic product model arranging a plurality of product categories in a hierarchy, said hierarchic product model defines a plurality of attributes for each one of said plurality of product categories and a plurality of values for each of said plurality of attributes;

receiving natural language product information for each of a plurality of products from a product-related dataset of an e-commerce data source, said natural language product information defining product information elements descriptive of a respective said product;

for each of said plurality of products automatically indexing one of a plurality of modeled product representations into said indexed hierarchic product database according to said hierarchic product model, said indexing into said indexed hierarchic product database is performed by:

creating a respective modeled product representation for said each product, said respective modeled product representation comprising at least some of a plurality of model elements, said plurality of model elements comprising said said plurality of product categories, said plurality of attributes and said plurality of values of said hierarchic product model, said selected model elements are corresponding to at least one of synonyms and similar terms of product information elements extracted, according to a natural language analysis (NLA), from a respective said natural language product information of said respective product, extracting from said hierarchic product, a plurality of hierarchic relations between said selected model attributes, and indexing said respective modeled product representation of said respective product in said indexed hierarchic product database according to said selected model elements and said plurality of hierarchic relations;

receiving a natural language search query comprising at least one searched product information element indicative of at least one searched product;

modeling said natural language search query to create a modeled search query comprising at least one of said plurality of model elements corresponding to said at least one searched product information element extracted from said natural language search query; and automatically matching said modeled search query with at least some of said plurality of modeled product representations defined in said indexed hierarchic product database and retrieving matching said modeled product representations; and transmitting a response to said natural language search query, said response comprising said matching modeled product representations.

22. The method of claim 21, wherein said modeling comprises:

determining at least one representation of the natural language search query received from a search server by elements of the hierarchic product model, by finding at least some of the plurality of model elements corresponding to the at least one searched product information elements in the hierarchic product model and selecting model elements that form consistent representation of the natural language search query with hierarchic relations between the selected model elements;

wherein said automatically creating comprises transmitting the at least one representation to the search server, thus enabling the search server to match the at least one representation of the natural language search query to modeled representations of products stored in the indexed hierarchic product database.

* * * * *